United States Patent
Liu

(10) Patent No.: US 12,074,643 B2
(45) Date of Patent: Aug. 27, 2024

(54) DATA TRANSMISSION METHOD AND APPARATUS, TERMINAL DEVICE AND STORAGE MEDIUM

(71) Applicant: ZTE CORPORATION, Shenzhen (CN)

(72) Inventor: Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 66 days.

(21) Appl. No.: 17/781,304

(22) PCT Filed: Oct. 30, 2020

(86) PCT No.: PCT/CN2020/125127
§ 371 (c)(1),
(2) Date: May 31, 2022

(87) PCT Pub. No.: WO2021/103928
PCT Pub. Date: Jun. 3, 2021

(65) Prior Publication Data
US 2022/0416895 A1     Dec. 29, 2022

(30) Foreign Application Priority Data

Nov. 28, 2019 (CN) .......................... 201911191941.7

(51) Int. Cl.
*H04B 10/27* (2013.01)
*H04L 5/00* (2006.01)

(52) U.S. Cl.
CPC ........... *H04B 10/27* (2013.01); *H04L 5/0064* (2013.01)

(58) Field of Classification Search
None
See application file for complete search history.

(56) References Cited

U.S. PATENT DOCUMENTS

| 5,917,634 A * | 6/1999 | Otobe ............... | G02B 6/4204 398/186 |
| 10,142,030 B1 * | 11/2018 | Blanks ............... | H04B 10/503 |
| 2016/0149645 A1 * | 5/2016 | Liu ................... | H04B 10/116 398/135 |

(Continued)

FOREIGN PATENT DOCUMENTS

| CN | 108632886 A | 10/2018 |
| CN | 110138498 A | 8/2019 |

(Continued)

OTHER PUBLICATIONS

International Search Report for Application No. PCT/CN2020/125127, dated Jan. 27, 2021, 4 pages including English translation.

*Primary Examiner* — Darren E Wolf
(74) *Attorney, Agent, or Firm* — Morgan, Lewis & Bockius LLP

(57) ABSTRACT

Provided are a data transmission method and apparatus, a terminal device, and a storage medium. The method includes determining a basic unit carrying client data, where the rate of the client data is smaller than the set value, the set value is determined according to the bandwidth of a flexible Ethernet (FlexE) slot, and the basic unit is a basic unit included in a basic unit set; mapping the client data to the basic unit; and sending, through the FlexE slot, the basic unit set to which the client data is mapped.

19 Claims, 10 Drawing Sheets

(56) References Cited

U.S. PATENT DOCUMENTS

| | | | |
|---|---|---|---|
| 2017/0005901 A1* | 1/2017 | Gareau | H04L 43/10 |
| 2021/0067249 A1* | 3/2021 | Hull | H04B 10/1143 |
| 2021/0076111 A1* | 3/2021 | Shew | H04L 12/4633 |

FOREIGN PATENT DOCUMENTS

| | | |
|---|---|---|
| CN | 111050403 A | 4/2020 |
| CN | 111092686 A | 5/2020 |
| WO | WO-2019062227 A1 | 4/2019 |
| WO | WO-2019174406 A1 | 9/2019 |

* cited by examiner

DATA TRANSMISSION METHOD AND APPARATUS, TERMINAL DEVICE AND STORAGE MEDIUM

CROSS-REFERENCE TO RELATED APPLICATION(S)

The is a national stage application filed under 37 U.S.C. 371 based on International Patent Application No. PCT/CN2020/125127, filed Oct. 30, 2020, which claims priority to Chinese Patent Application No. 201911191941.7 filed with the China National Intellectual Property Administration (CNIPA) on Nov. 28, 2019, the disclosure of which is incorporated herein by reference in its entirety.

TECHNICAL FIELD

The present application relates to the field of communications and, in particular, to a data transmission method and apparatus, a terminal device, and a storage medium.

BACKGROUND

A rapid growth in user information traffic has prompted a rapid increase in the information transmission bandwidth of communication networks. The interface bandwidth rate of communication devices has increased from 10M (unit: bit/second, similar below) to 100M and then increased to 1G, 10G, and 100G. A large number of commercial 100G optical modules have emerged in the market. At present, 400G optical modules have been developed, but the 400G optical modules are expensive, exceeding the price of four 100G optical modules, resulting in the low commercial economic value of 400G optical modules. Therefore, in order to transmit 400G services on 100G optical modules, the International Organization for Standardization has defined the Flexible Ethernet (FlexE) protocol. The FlexE protocol bundles multiple 100G optical modules to form a transmission channel with a larger transmission rate.

However, as for low-rate client data, for example, service data whose rate is smaller than 5G, in the case of low time-delay and high-quality transmission requirements, one client service can be transmitted on one 5G slot, maintaining the transmission quality of the FlexE technology. One 5G slot transmits only one low-rate service, but the transmission efficiency is very low.

SUMMARY

The present application provides a data transmission method and apparatus, a terminal device, and a storage medium.

In a first aspect, embodiments of the present application provide a data transmission method. The method includes the following.

A basic unit carrying client data is determined. The rate of the client data is smaller than the set value. The set value is determined according to the bandwidth of a flexible Ethernet (FlexE) slot. The basic unit is a basic unit included in a basic unit set.

The client data is mapped to the basic unit.

The basic unit set to which the client data is mapped is sent through the FlexE slot.

In a second aspect, embodiments of the present application provide a data transmission method. The method includes the following.

A basic unit set is recovered from a FlexE slot.

Client data is extracted from the basic unit set. The basic unit set includes a basic unit carrying the client data. The rate of the client data is smaller than the set value. The set value is determined according to the bandwidth of the FlexE slot.

In a third aspect, embodiments of the present application provide a data transmission apparatus. The apparatus includes a determination module, a mapping module, and a sending module.

The determination module is configured to determine a basic unit carrying client data. The rate of the client data is smaller than the set value. The basic unit is a basic unit included in a basic unit set.

The mapping module is configured to map the client data to the basic unit.

The sending module is configured to send, through the flexible Ethernet (FlexE) slot, the basic unit set to which the client data is mapped.

In a fourth aspect, embodiments of the present application provide a data transmission apparatus. The apparatus includes a recovery module and an extraction module.

The recovery module is configured to recover a basic unit set from a FlexE slot.

The extraction module is configured to extract client data from the basic unit set.

In a fifth aspect, embodiments of the present application provide a terminal device. The terminal device includes one or more processors and a storage apparatus configured to store one or more programs.

When executed by the one or more processors, the one or more programs cause the one or more processors to implement any method provided in embodiments of the present application.

In a sixth aspect, embodiments of the present application provide a storage medium storing a computer program which, when executed by a processor, causes the processor to implement any method provided in embodiments of the present application.

The preceding embodiments and other aspects of the present application and implementations thereof are described in more detail in the brief description of drawings, detailed description, and claims.

DETAILED DESCRIPTION

To illustrate the object, solutions and advantages of the present application clearer, embodiments of the present application are described hereinafter in detail in conjunction with the drawings. It is to be noted that if not in collision, embodiments of the present application and features therein may be combined with each other in any manner.

The procedures illustrated in the flowcharts among the drawings may be performed by, for example, a computer system capable of executing a set of computer-executable instructions. Moreover, although logical sequences are illustrated in the flowcharts, the procedures illustrated or described may be performed in sequences different from those described here in some cases.

Figure 1:
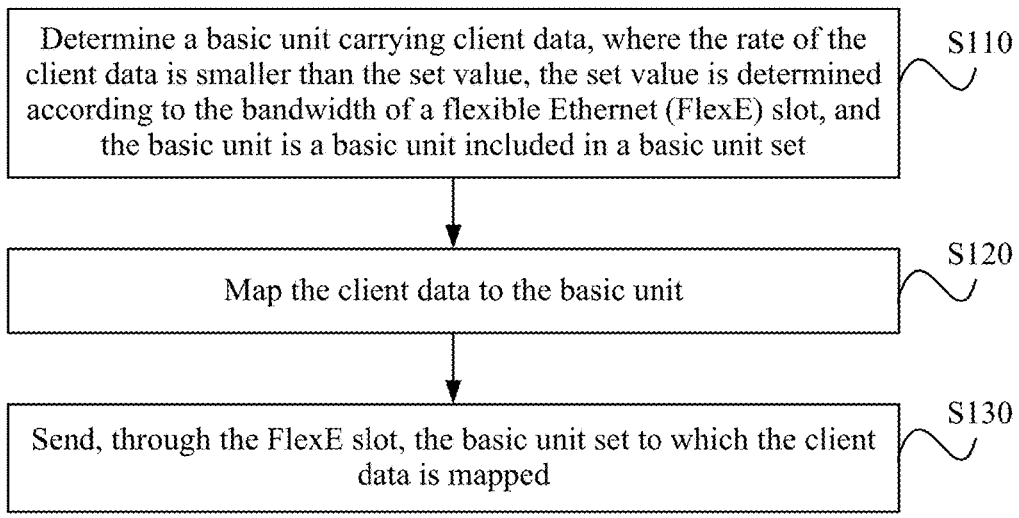
FIG. 1 is a flowchart of a data transmission method according to the present application.

In an exemplary embodiment, FIG. 1 is a flowchart of a data transmission method according to the present application. The method can be applied to the case of improving the transmission efficiency of the client data whose rate is smaller than the set value. The method may be performed by a data transmission apparatus provided in the present application. The apparatus may be implemented by software and/or hardware and integrated into a terminal device. The terminal device may cover any suitable type of user equipment. The terminal device may be a device sending client data.

Figure 1A:
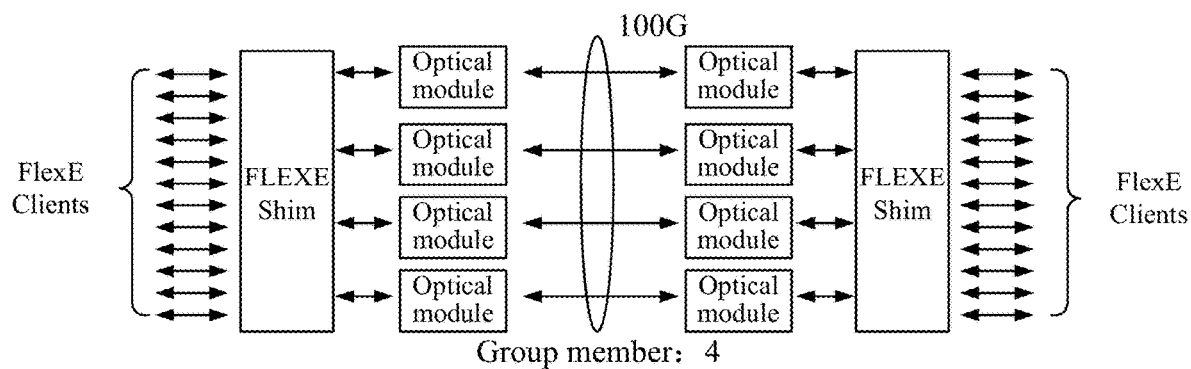
FIG. 1A is a diagram of the principle of the FlexE protocol according to the present application.

FIG. 1A is a diagram of the principle of the FlexE protocol according to the present application. Referring to FIG. 1A, four 100G optical modules are combined together by the FlexE protocol to form one 400G transmission channel, which is equivalent to the transmission rate of one 400G optical module, thereby solving the transmission requirements of 400G services without increasing costs.

Figure 1B:
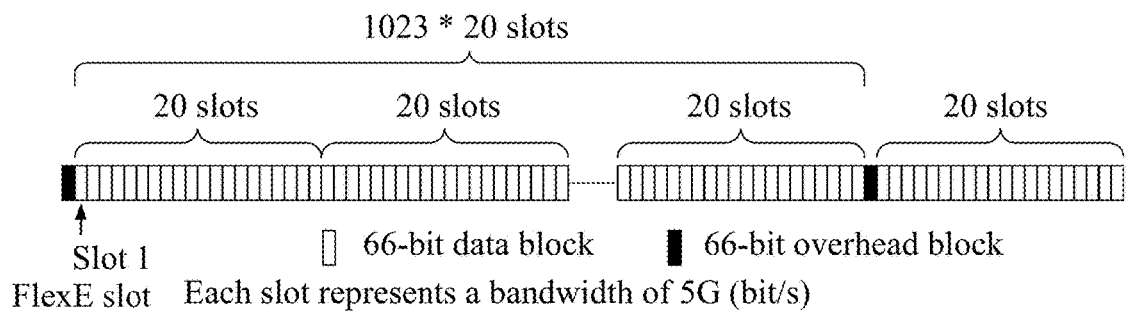
FIG. 1B is a diagram illustrating the arrangement relationship of overhead blocks and data code blocks in the FlexE protocol according to the present application.

At present, physical layers defined by the FlexE protocol are 100 G, 200 G, and 400 G. 20 slots are defined on a 100G physical layer. Each slot corresponds to a bandwidth of 5G bit/s and is referred to as a FlexE slot in the present application. 200G physical layer services and 400G physical layer services are transmitted by interleaving and multiplexing a service rate of two 100G and a service rate of four 100G into a service rate of 200G and a service rate of 400G respectively. In an optical module, a 100G client packet is 64/66 encoded before being sent. The bit value of the 64-bit client packet is encoded into a 66-bit information block. The added 2 bits are located in the front of the 66-bit block to serve as the leading flag of the 66-bit block. After that, the client packet is sent out from an optical port in the form of the 66-bit block. In the receiving process, the optical port discriminates the 66-bit block from the received data stream, recovers the original 64-bit data from the 66-bit block, and obtains the data packet by way of recombination. The FlexE protocol is from the 64-bit conversion layer and below the 66-bit conversion layer. The 66-bit code block is sorted and planned before the 66-bit block is sent. FIG. 1B is a diagram illustrating the arrangement relationship of overhead blocks and data code blocks in the FlexE protocol according to the present application. As shown in FIG. 1B, for a 100G service, every 20 66-bit data code blocks are classified into one data code block group. Each group has 20 data code blocks, which represent 20 slots whose total bandwidth is 100G. Each slot represents a service bandwidth at a rate of 5G (bit/s). During transmission of 66-bit data code blocks, each time 1023*20 data code blocks are sent out, one FlexE overhead block (which is a black block as shown in FIG. 1B) is inserted. After one overhead block is inserted, the second group of 1023*20 data code blocks continues being sent out and then another overhead block is inserted. The rest can be done in the same manner. In this way, during the transmission of data code blocks, an overhead block is periodically inserted. The interval between two adjacent overhead blocks is 1023*20 data code blocks.

Figure 1C:
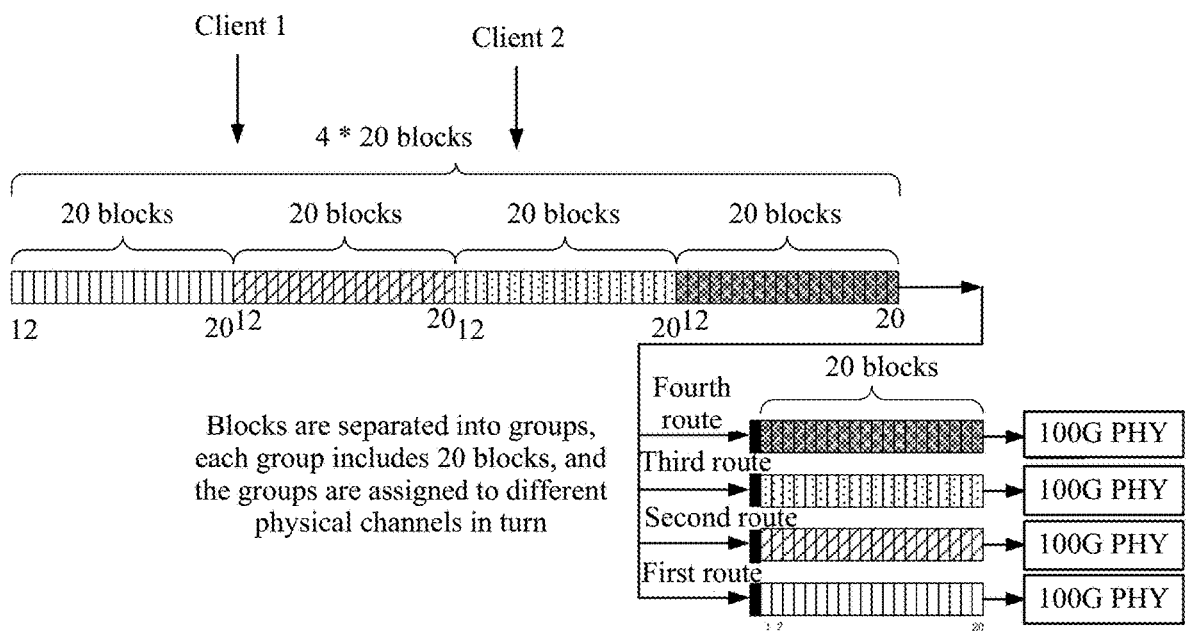
FIG. 1C is a diagram illustrating the allocation of client services over multiple physical channels in the FlexE protocol in the sending direction according to the present application.

FIG. 1C is a diagram illustrating the allocation of client services over multiple physical channels in the FlexE protocol in the sending direction according to the present application. Referring to FIG. 1C, when four 100G physical layers constitute one 400G logical service bandwidth, in each physical layer, 20 data code blocks are classified into one data code block group, and one overhead byte is inserted every 1023 data code block groups. In the upper layer of the FlexE protocol, four 20 data code blocks are combined into one data code block group consisting of 80 data code blocks. The data code block group represents 80 slots. Client services are transmitted in the 80 slots. Each slot has a bandwidth of 5G, and the total service transmission bandwidth is 400 G.

Figure 1D:
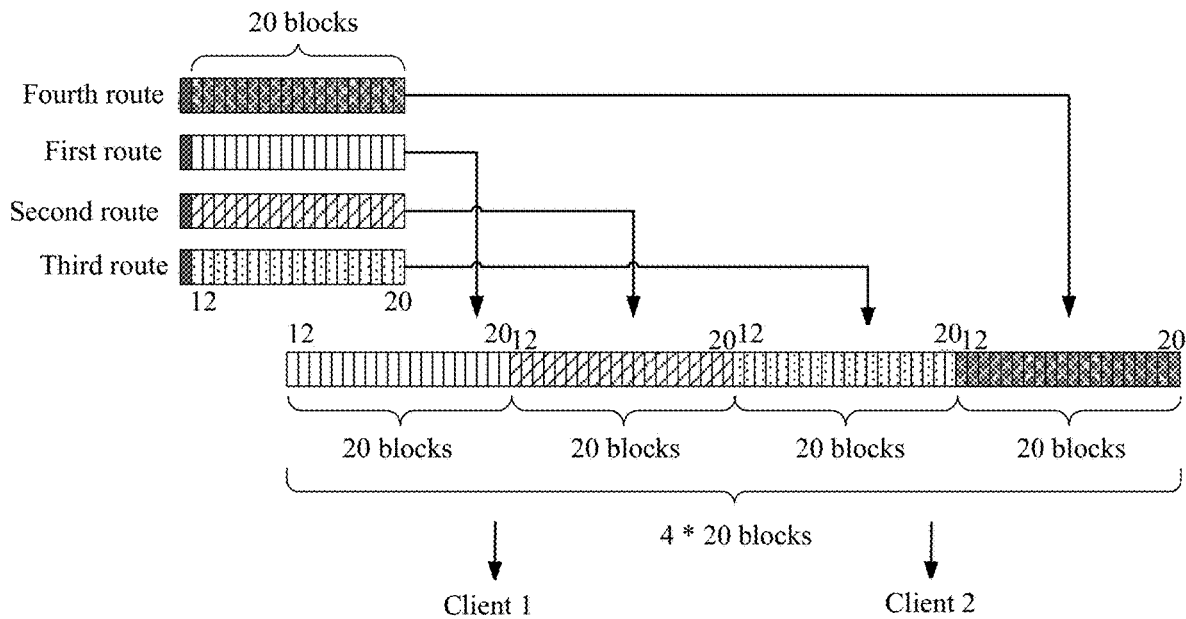
FIG. 1D is a diagram illustrating the recovery of client services over multiple physical channels in the FlexE protocol in the receiving direction according to the present application.

FIG. 1D is a diagram illustrating the recovery of client services over multiple physical channels in the FlexE protocol in the receiving direction according to the present application. Referring to FIG. 1D, in the receiving end, the four routes of physical ports operate separately according to the FlexE protocol to determine the location of each FlexE overhead block and the frame structure. Then the four routes of slots are sorted according to the sequential relationship to recover the 80 slots. The client services are extracted from the 80 slots.

The FlexE overhead block is a 66-bit code block with special content. When a service data stream is sent, one overhead block is inserted every 1023*20 blocks. An overhead block plays a positioning function in the entire service flow. When an overhead block is found, the position of the first slot and the positions of the subsequent slots can be determined.

Eight consecutive overhead blocks have different definitions and content. Eight consecutive overhead blocks constitute one overhead frame. One overhead block is composed of a 2-bit block flag and 64-bit block content. The block flag is in the first two columns while the block content is in the subsequent 64 columns. The block flag of the first overhead block is 10 while the block flag of the subsequent seven overhead blocks is 01 or SS (SS means that the content is uncertain). The content of the first overhead block is 0x4B (8 bits, hexadecimal 4B), C bit (1 bit, indicating adjustment control), OMF bit (1 bit, indicating an overhead frame multiframe), RPF bit (1 bit, indicating a remote defect), SC bit (1 bit, synchronizing configuration), member group number (20 bits, that is, FlexE group number), 0x5 (4 bits, hexadecimal 5), and 000000 (28 bits, all 0s). 0x4B and 0x5 are the flag indicators of the first overhead block. During receiving, when it is found that the corresponding positions in an overhead block are 0x4B and 0x5, it indicates that this overhead block is the first overhead block in the overhead frame, and this overhead block and the subsequent seven consecutive overhead blocks constitute one overhead frame. In the overhead frame, the reserved part is reserved content, which has not been defined yet.

According to the FlexE protocol, eight overhead blocks form one frame. Among the eight overhead blocks, the first overhead block is indicated by two fields 4B (which is hexadecimal and indicated by 0x4B) and 05 (which is hexadecimal and indicated by 0x5). When it is detected that, in an overhead block, the content at the corresponding positions is 4B and 05, it indicates that this overhead block is the first overhead block, and this overhead block and the subsequent seven overhead blocks form one frame. In the first overhead block, the OMF field is a multiframe indication signal.

OMF is a single-bit value, which is 0 in 16 consecutive frames, then 1 in 16 consecutive frames, then 0 in 16 consecutive frames, and then 1 in 16 consecutive frames, repeated every 32 frames. In this way, one multiframe is composed of 32 frames.

20 slots are defined on a 100G physical layer (PHY) interface according to the FlexE protocol. Each slot has a bandwidth of 5G (bit/s). A member group is formed through a combination of multiple 100G PHYs so that various types of high-rate, such as 200G, 300G, and 400G, client services can be achieved.

When multiple FlexE physical members form a group, the calendar, that is, the calendar layer, shows x*20 slots (x is the number of members), and the client services have been mapped to the selected slots on the calendar layer for transmission. On the calendar layer, each slot represents a bandwidth of 5G bit/s. One client selects at least one slot for transmission. The minimum bandwidth of a carried client service is 5G bit/s. When the bandwidth of a client service is smaller than 5G bit/s, the client service must also occupy one 5G slot, resulting in a waste of bandwidth. In the Ethernet standard definition, client services include many low-rate, such as, 10M, 100M, and 1G, services. These client services may be a special line for an enterprise group, a special line between bank branches, and a special line for a government agency that need to be transmitted through independent channels so as to achieve physical isolation and ensure information security. The FlexE protocol provides the slot function to achieve physical isolation. However, when a 5G channel is used for carrying a 1G or 100M client service, the carrying bandwidth is wasted seriously.

On the basis of the FlexE protocol, the present application provides a high-quality and high-efficiency transmission method for low-rate small-particle client services.

As shown in FIG. 1, a data transmission method provided in the present application includes S110, S120, and S130.

In S110, a basic unit carrying client data is determined. The rate of the client data is smaller than the set value. The set value is determined according to the bandwidth of a flexible Ethernet (FlexE) slot. The basic unit is a basic unit included in a basic unit set.

The transmitted data in the present application is the client data. The client data is carried on the basic unit set and sent through the FlexE slot to other terminal devices, for example, a terminal device communicating with this terminal device. The communication content includes the client data.

The client data in the present application may be carried on part of at least one basic unit in the basic unit set. The client data of one terminal device may be mapped to part of the at least one basic unit in the basic unit set so that the basic unit set can carry the client data of at least one terminal device, enhancing transmission efficiency through mapping the client data of multiple terminal devices to the basic unit set.

Specifically, in the present application, in the case where the client data is sent, a basic unit carrying the client data is determined first. The basic unit is a basic unit included in the basic unit set. For example, the basic unit set includes n basic units, where n is a positive integer. In S110, the basic unit carrying the client data of the terminal device may be basic unit 1, basic unit 6, basic unit 11, basic unit 16, . . . or may be basic unit 1 to basic unit m, where m is a positive integer smaller than n. That is, at least two basic units spaced in the basic unit set or at least two consecutive basic units in the basic unit set may carry the client data; alternatively, one basic unit in the basic unit set may carry the client data.

In S110, determining a basic unit may be understood as determining the format of the basic unit and determining the label of the basic unit, that is, the sequence number of the basic unit. Different basic units may have different formats. For example, in the case where a basic unit is a cell, the format of the basic unit may be 66-bit code blocks or bytes. The format of a basic unit is not limited here. After the format of a basic unit is determined, the sequence number of the basic unit is determined in the present application. Each basic unit in the basic unit set is labeled with a sequence number. In S110, the sequence number of the basic unit carrying the client data is determined.

The present application does not limit which basic units are used for carrying the client data as long as both parties in communication make a pre-determination, thereby preventing the client data of different terminal devices from being mapped to the same basic unit.

In the present application, the rate of the client data is smaller than the set value. The set value is determined based on the bandwidth of the FlexE slot. For example, the set value is the bandwidth of the FlexE slot. The rate of the client data in the present application is smaller than the bandwidth of the FlexE slot. For example, in the case where the bandwidth of the FlexE slot is 5G, the client data described in the present application is data smaller than 5G and is also referred to as a small-particle client service.

In one embodiment, for the present application, the number of at least one basic unit carrying the client data is determined based on the bandwidth required by the client data and the carrying bandwidth of a single basic unit. The carrying bandwidth of a single basic unit is determined based on the bandwidth of the FlexE slot and the cycle period of basic units. For example, the bandwidth of a single basic unit is obtained by dividing the bandwidth of the FlexE slot by the cycle period of basic units. The cycle period may be considered as the number of basic units included in the basic unit set.

In S120, the client data is mapped to the basic unit.

After the basic unit is determined, the client data is mapped to the basic unit in the present application. That is, the basic unit set carries the client data.

In S130, the basic unit set to which the client data is mapped is sent through the FlexE slot.

After the client data is mapped completely, the basic unit set to which the client data is mapped can be sent through the FlexE slot in S130.

The data transmission method provided in the present application includes determining a basic unit carrying client data, where the rate of the client data is smaller than the set value, the set value is determined according to the bandwidth of a flexible Ethernet (FlexE) slot, and the basic unit is a basic unit included in a basic unit set; mapping the client data to the basic unit; and sending, through the FlexE slot, the basic unit set to which the client data is mapped. Each basic unit in the basic unit set serves as a transmission channel. The FlexE time slot is divided into multiple sub-channels. The number of sub-channels is determined according to the number of basic units included in the basic unit set. In this case, the transmission efficiency of the client data whose rate is smaller than the set value is improved.

On the basis of the preceding embodiments, variant embodiments of the preceding embodiment are proposed. It is to be noted here that for ease of description, only differences from the preceding embodiment are described in the variant embodiments.

In one embodiment, the basic unit includes a packet or a cell.

In one embodiment, the basic unit set includes at least one basic unit and is used for carrying the client data of at least one terminal device.

The client data of different terminal devices may be mapped to different basic units in the basic unit set so as to improve the utilization of the FlexE slot.

In one embodiment, overhead information is included on the basic unit. The overhead information includes one or more of the following: sequence information used for identifying the basic unit, idle indication information, or operations, administration and maintenance information.

The overhead information is used for identifying the basic unit. For example, the sequence information in the overhead information may be a sequence number used for identifying a basic unit in the basic unit set. The idle indication information is used for indicating whether the basic unit is an idle basic unit. The idle indication information may be null cell indication information used for indicating whether to be an idle cell or a service cell. The operations, administration and maintenance (OAM) information is used for operating, administrating, and maintaining the basic unit. For example, the operations, administration and maintenance information includes at least one or more of the following: a near-end error code, a remote error code, a client indication, delay time, client type, a local defect, or a remote defect.

In one embodiment, in the case where the basic unit is a cell, the cell is formed by combining different target code blocks. The target code blocks include a border control code block and a data code block. The data code block is used for carrying the client data. The border control code block is used for identifying a border of the cell. The border control code block includes one or more of the following: an S block, a T block, an O block, or a predefined control code block.

A predefined control code block may be a user-defined control code block as long as the predefined control code block can be used for identifying a border of the cell.

In the case where the border control code block includes an S block and a T block, the S block and the T block are used for identifying the start and end of the basic unit respectively. In the case where the border control code block includes only S blocks, the S blocks are used for identifying the start and end of the basic unit; that is, the S blocks are arranged at the starting position of the basic unit and the ending position of the basic unit. In the case where the border control code block includes only T blocks, the T blocks are used for identifying the start and end of the basic unit; that is, the T blocks are arranged at the starting position of the basic unit and the ending position of the basic unit. In the case where the border control code block includes only an O block, the O block is used for identifying the start and end of the basic unit and is arranged only at the starting position of the basic unit. In the case where the border control code block includes only a predefined control code block, the predefined control code block is used for identifying the start and end of the basic unit and is arranged only at the starting position of the basic unit.

One or more of the S block, the T block, the O block, or the predefined control code block may be combined arbitrarily to identify one basic unit, which is not limited here.

In one embodiment, the overhead information in the basic unit is carried on the target code blocks.

The overhead information of the basic unit is carried on the target code blocks; that is, the overhead information of the basic unit is carried on one or more of the following code blocks: a border control code block or a data code block.

In one embodiment, that the client data is mapped to the basic unit includes the following.

In the case where the basic unit is a packet, the client data is mapped to the content carrying part of the packet.

In the case where the basic unit is a cell, the client data is mapped to a data code block of the cell.

In one embodiment, at least one FlexE slot is provided.

In the case where at least two FlexE slots are provided, the basic unit set is transmitted on the FlexE slots in sequence.

In one embodiment, in the case where the basic unit set is sent through the FlexE slot, an idle information block is inserted every set number of basic units.

The rate adjustment capability can be improved by inserting an idle information block. The set number is not limited here and can be determined by those skilled in the art according to the receiving rate of the terminal device and the sending rate of the terminal device. An idle information block may not carry the client data so as to adjust the rate.

Additionally, in the case where the basic unit is a cell, the client data in the present application may be directly mapped to the cell. Alternatively, the client data may be encoded, and then the encoded data is mapped to the cell. When being encoded, the client data may be 64/66 encoded; alternatively, the client data may be 64/66 encoded and 256/257 encoded, that is, 64/66 encoded first and then 256/257 encoded.

Figure 2:
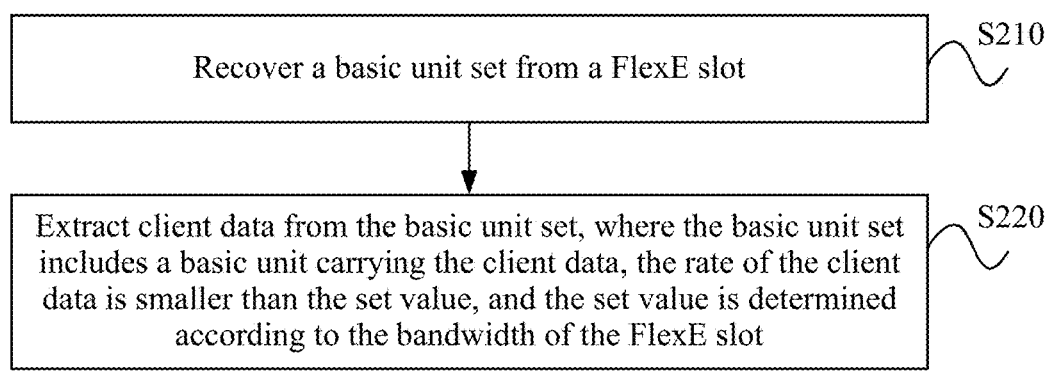
FIG. 2 is a flowchart of another data transmission method according to the present application.

The present application provides a data transmission method. FIG. 2 is a flowchart of another data transmission method according to the present application. The method can be applied to the case of receiving client data on a terminal device. The client data is carried on a corresponding basic unit. The rate of the client data is smaller than the set value. This method may be performed by a data transmission apparatus provided in the present application. The data transmission apparatus may be implemented by software and/or hardware and integrated into a terminal device. The terminal device may be a device receiving client data.

As shown in FIG. 2, the data transmission method provided in the present application includes S210 to S220.

In S210, a basic unit set is recovered from a FlexE slot.

In the present application, the FlexE slot is determined first. The slot may be pre-determined by terminal devices in communication and is not limited here. Then the basic unit set is recovered from the FlexE slot. For example, based on the number of basic units included in the basic unit set, a corresponding number of basic units are extracted from the FlexE slot to recover the basic unit set. Each basic unit in the basic unit set has a corresponding sequence number. The basic unit set can be recovered based on the sequence number of each basic unit.

In S220, client data is extracted from the basic unit set. The basic unit set includes a basic unit carrying the client data. The rate of the client data is smaller than the set value. The set value is determined according to the bandwidth of the FlexE slot.

After the basic unit set is recovered, the client data is extracted from the basic unit set in the present application. When the client data is extracted, the basic unit carrying the client data is determined first; then the carried data is extracted from the basic unit; finally, the client data is obtained according to the sequence number and carried content of each basic unit. For example, the client data is obtained by splicing the data of each basic unit according to the sequence number of each basic unit.

When the client data after being encoded is carried on a packet or a cell, the bit value extracted from the packet or the cell is decoded to recover the content of the original client packet, that is, the client data before being encoded.

For the content that is not yet exhaustive in the embodiment, reference may be made to the preceding embodiments, which is not repeated here.

The data transmission method provided in the present application includes recovering a basic unit set from a FlexE slot and extracting client data from the basic unit set. The basic unit set includes a basic unit carrying the client data. The rate of the client data is smaller than the set value. The set value is determined according to the bandwidth of the FlexE slot. The method helps improve the transmission efficiency of the client data whose rate is smaller than the set value.

On the basis of the preceding embodiments, variant embodiments of the preceding embodiment are proposed. It is to be noted here that for ease of description, only differences from the preceding embodiment are described in the variant embodiments.

In one embodiment, that the client data is extracted from the basic unit set includes the following.

The basic unit that carries the client data and is in the basic unit set is determined.

The client data carried in the basic unit is extracted.

In the present application, in the case where the client data is extracted, the basic unit that carries the client data and is in the basic unit set is determined first. For example, the sequence number, that is, sequence information, of the basic unit carrying the client data is determined. The sequence information may be pre-determined by both parties in communication. In the present application, a terminal device sending the basic unit set is a sending device, and a terminal device receiving the basic unit set to extract the client data is a receiving device.

After the basic unit is determined, the client data carried on the basic unit is directly extracted in the present application. At least one basic unit is determined. In the case where at least two basic units are determined, the client data can be obtained by splicing the content carried by the basic units according to the sequence number of each basic unit.

In the present application, in the case where the client data is extracted, the client data may be the client data of one terminal device. The extraction of the client data of different terminal devices may adopt the same technical means, which is not limited here. For example, the basic unit set carries client data 1 of terminal device a and client data 2 of terminal device b. In the present application, client data extraction may be considered as the process of extracting client data 1 of terminal device a or client data 2 of terminal device b.

In one embodiment, that the basic unit that carries the client data and is in the basic unit set is determined includes the following.

The sequence information of the basic unit carrying the client data is determined.

The basic unit that carries the client data and is in the basic unit set is determined based on the sequence information.

In the present application, the sequence information is extracted from the overhead information of the basic unit, and then the basic unit that corresponds to the sequence information and is in the basic unit set is taken as the basic unit carrying the client unit.

In one embodiment, the basic unit set includes at least one basic unit and is used for carrying the client data of at least one terminal device.

In one embodiment, the basic unit includes a packet or a cell.

In one embodiment, overhead information is included on the basic unit. The overhead information includes one or more of the following: sequence information used for identifying the basic unit, idle indication information, or operations, administration and maintenance information.

In one embodiment, in the case where the basic unit is a cell, the cell is formed by combining different target code blocks. The target code blocks include a border control code block and a data code block. The data code block is used for carrying the client data. The border control code block is used for identifying a border of the cell. The border control code block includes one or more of the following: an S block, a T block, an O block, or a predefined control code block.

In one embodiment, the overhead information in the basic unit is carried on the target code blocks.

In one embodiment, at least one FlexE slot is provided.

An exemplary description of the present application is made below.

The data transmission method described in the present application may be considered as a transmission method for the transmission of low-rate clients (that is, client data) in the FlexE protocol. For example, the method is a high-efficiency and high-quality transmission method when the rate of a carried client service is smaller than 5G bit/s.

In the past few decades, network traffic has been surging at a high rate, prompting a rapid growth of the service bandwidth of communication devices. The interface rate of communication devices has increased from 10M (unit: bit/s, similar below) to 100M, then 1G, and then 10G. The service rate doubles every few years. The FlexE protocol meets the transmission requirement of 400G services and solves the economic value problem of service transmission.

As for low-rate services, that is, client rate, whose rate is smaller than 5G, which indicates that client data is small-particle services (in the present application, such services are uniformly referred to as small-particle services, that is, various client services whose rate is smaller than 5G, for example, 1G, 100M, 10M, and 2M), in the case of low time-delay and high-quality transmission requirements, one client service can be transmitted on one 5G slot, maintaining the transmission quality of the FlexE technology. One 5G slot transmits only one low-rate service, but the transmission efficiency is very low.

The data transmission method in the present application may include the following.

In 1, at a sending end, the format of each packet or cell carrying a small-particle service is determined, and the small-particle service is mapped to each corresponding packet or cell.

The small-particle service may be considered as client data. The rate of the client data is smaller than the set value. A packet or cell may be considered as a basic unit used for carrying the small-particle service. In the present application, the format of each packet or cell carrying the small-particle service is determined first. For example, as for the format, a cell may be composed of bytes or bit blocks. Additionally, the sequence number of each packet or cell carrying the small-particle service is also determined so as to determine each packet or cell to which the small-particle service is mapped.

In 2, at the sending end, all packets or cells are sent out in sequence through the FlexE slot.

In 3, at a receiving end, all the packets or cells are recovered from the corresponding FlexE slot.

The corresponding FlexE slot may be considered as a slot sending the packets or cells.

In 4, at the receiving end, mapped content is extracted from each corresponding packet or cell to recover the small-particle client service Part of all the packets or cells are used for carrying the client data of one terminal device. In the present application, the mapped content is extracted from each packet or cell corresponding to the terminal device to recover the small-particle client service. All the packets or cells may carry the client data of at least one terminal device. Each packet or cell has a unique sequence number. In the present application, a packet or cell is selected based on the sequence number of the packet or cell to extract the client data.

1 may specifically include the following.

In 1.1, a small-particle service mapping object may be a standard Ethernet packet structure or a cell structure.

In 1.2, the packet or the cell carries a sequence number and an overhead byte. All the cells are divided into multiple sub-cells based on sequence numbers (that is, all cells are labeled and each label corresponds to one cell). A sub-cell provides a transmission sub-channel. The overhead byte provides, including but not limited to, OAM information and time information.

The sequence number and the overhead byte may be considered as overhead information. The time information may be the delay time in the OAM information.

In 1.3, the cell may be formed by combining different code blocks in 64/66 encoding specifications, where a special control code block is used for identifying a border of the cell and a data code block is used for carrying client content. The special control code block may be an S block, a T block, an O block, or any other defined control block.

In 1.4, the bit value of the small-particle client service may be directly mapped to the packet or the cell; alternatively, the content of the small-particle client service may be encoded first, and then the encoded result is mapped to the packet or the cell. When the content of the small-particle client service is encoded, 64/66 encoding may be used; alternatively, 64/66 encoding and 256/257 encoding may be used in combination. For example, the content of the small-particle client service is 64/66 encoded first and then 256/257 encoded.

In 1.5, when the packet format is used, the mapping process is that the client service is directly filled into the content carrying part of each packet. When a cell composed of 66-bit blocks is used, the mapping process is that the bit value of the client service is filled into a data code block. When the client packet is encoded, the encoded bit value is filled into a data code block.

2 includes the following.

In 2.1, when the small-particle service is carried using the Ethernet packet format, an Ethernet packet is 64/66 encoded according to FlexE protocol specifications, and then 66-bit code blocks are sent out through the FlexE slot.

In 2.2, when the small-particle service is carried through a cell composed of 66-bit code blocks, the cell code blocks are sent out directly through the FlexE slot.

In 2.3, one packet stream or one cell stream may be carried by one FlexE slot and sent out or may be carried by multiple FlexE slots and sent out.

In 2.4, in a cell stream, two consecutive cells are completely adjacent to each other with no idle interval in between. When the cell stream is sent through the FlexE slot, an appropriate idle information block (IDLE) is inserted to provide the rate adjustment capability.

4 includes the following.

In 4.1, the sequence number carried by each packet or cell is determined, and the client content, that is, the client data, is extracted from each packet or cell with a corresponding sequence number.

The corresponding sequence number may be considered as the sequence number corresponding to the terminal device whose client data is to be extracted. Different terminal devices may have different sequence numbers for identifying the packets or cells on which the client data of the terminal devices is carried.

In 4.2, when the client content after being encoded is carried on a packet or a cell, the bit value extracted from the packet or the cell is decoded to recover the content of the original client packet.

Figure 2A:
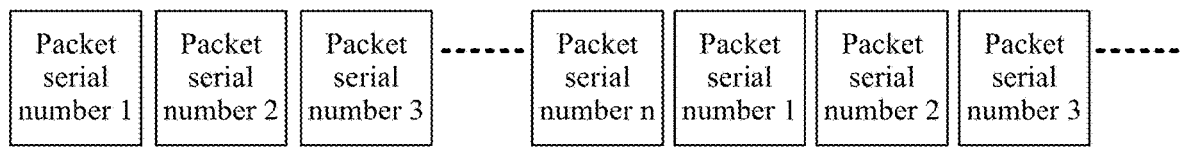
FIG. 2A is a diagram illustrating that the transmission of a small-particle service on a FlexE slot is implemented using serial packets according to the present application.

In the present application, a virtual intermediate client is determined. The rate bandwidth of the virtual intermediate client is 5G. A packet of the virtual intermediate client is a fixed-length packet (a fixed-length packet or a fixed-length cell is collectively referred to as a cell packet), which can be carried at full rate on a FlexE slot. FIG. 2A is a diagram illustrating that the transmission of a small-particle service on a FlexE slot is implemented using serial packets according to the present application. Referring to FIG. 2A, a fixed-length packet carries a sequence number, that is, a serial number. A sequence number appears circularly. Sequence numbers divide virtual intermediate client packets into many sub-slot packets (for example, the virtual intermediate client includes N packets, the sequence numbers are used for identifying each packet, and each packet can be considered as one sub-slot packet). Each sub-slot packet provides one transmission sub-channel.

When all the virtual intermediate client packets have the same length (that is, each basic unit included in the virtual intermediate client packets has a fixed length), the virtual intermediate client packets are divided, through the sequence numbers, into many sub-slot packets with the same rate. Each sub-slot packet provides one transmission sub-channel. The rate of all sub-slot channels is exactly the same. Real original clients are carried in the virtual intermediate client packets. The content of different original client packets is placed in cell packets (that is, transmission sub-channels) with different sequence numbers. For example, the first client is placed in cell packets with sequence numbers of 1, 6, 11, . . . , and n*5+1 (n is a natural number of 0, 1, 2 or 3, the same below); the second client is placed in cell packets with sequence numbers of 2, 7, 12, . . . , and n*5+2; the third client is placed in cell packets with sequence numbers of 3, 8, 13, . . . , and n*5+3; the fourth client is placed in cell packets with sequence numbers of 4, 9, 14, . . . , and n*5+4; and the fifth client is placed in cell packets with sequence numbers of 5, 10, 15, . . . , and n*5+5. In this method, one cell is selected every five cells to carry one real customer. In this case, the virtual intermediate client is evenly divided into five equal parts. The rate of each part is one fifth of the rate of the virtual intermediate client. When the rate of the virtual intermediate client is 5G, the rate of each part is 1G. In this case, the intermediate virtual client whose rate is 5G is evenly changed into five parts so that five transmission sub-channels are formed. The bandwidth of each transmission sub-channel is 1G. The five 1G transmission sub-channels share a FlexE slot. Each sub-channel carries a real client. Real clients are physically isolated from each other completely and do not affect each other.

Figure 2B:
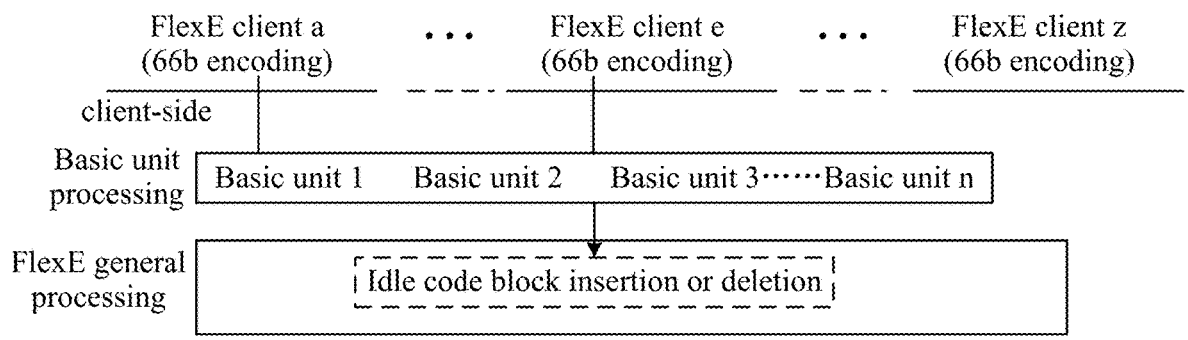
FIG. 2B is a diagram of the positional relationship between the small-particle service processing link and the FlexE protocol processing link according to the present application.

FIG. 2B is a diagram of the positional relationship between the small-particle service processing link and the FlexE protocol processing link according to the present application. Referring to FIG. 2B, the client data of FlexE clients, from FlexE client a to FlexE client e is carried on basic unit 1, basic unit 2, basic unit 3, . . . , and basic unit n to form a virtual intermediate client. The processing means after the virtual intermediate client is formed is the same as the processing means in the related art. For example, FlexE general processing is performed, including but not limited to inserting or deleting an idle code block, and then 100G physical interface processing is performed.

As for the format, a virtual client packet is a fixed-rate and fixed-length packet and may be a standard Ethernet packet.

Figure 2C:
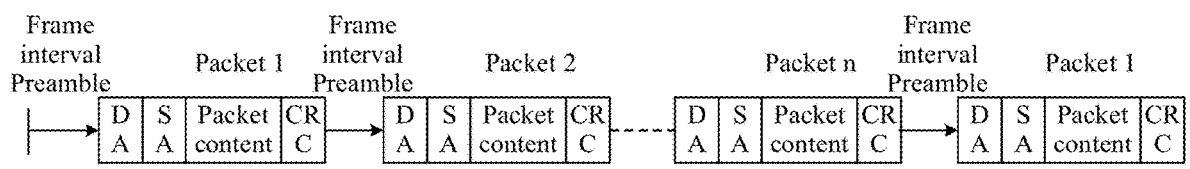
FIG. 2C is a diagram illustrating that the transmission of small-particle services is implemented using Ethernet packets with sequence numbers according to the present application.

FIG. 2C is a diagram illustrating that the transmission of small-particle services is implemented using Ethernet packets with sequence numbers according to the present application. Referring to FIG. 2C, a standard Ethernet packet consists of a source address (SA), a target address (DA), a packet content part, and a cyclic redundancy check (CRC) part (4 bytes). The source address (SA) and the target address (DA) are, for example, the source media access control (MAC) address (6 bytes) and the destination MAC address information (6 bytes) respectively. The packet content part is used for carrying real client information. A frame interval (12 bytes on average) and a preamble (1-byte frame delimiter and 7-byte preamble, a total of 8 bytes) between packets. It is seen from FIG. 2C that the proportion of the packet content part in the entire packet (including a frame interval and a preamble) is not high, resulting in low utilization of transmission bandwidth. When the packet is shorter, the packet content part is less and the bandwidth utilization rate is lower. As for a packet with a minimum length of 64 bytes (with no frame interval or preamble included), the packet content part occupies only 48 bytes, and the actual bandwidth utilization rate is only that 48/(64+12+8)=57.14%. When a virtual intermediate client packet is carried through a FlexE slot, the packet is 64/66 encoded first and, after being converted into a 66-bit code block, carried on the FlexE slot for transmission.

Ethernet standards formulate 64/66 encoding rules, according to which the 64-bit (8-byte) client information, that is, the 64-bit (8-byte) client data, is converted into a 66-bit code block. The first two bits are synchronization header bits. When the value of the synchronization header value is "01", it indicates that the code block is a data code block (D block). The next 8 bytes (64 bits) are the byte content of the code block. Other parts of the virtual intermediate client packet include the source MAC address, the destination MAC address information, the packet body, and the CRC part. After being encoded, these parts become a D block. For example, the D block includes $D_0$, $D_1$, $D_2$, $D_3$, $D_4$, $D_5$, $D_6$, and $D_7$. When the value of the synchronization header value is "10", it indicates that the code block is a control block. The content of the first byte (8 bits) behind the synchronization header is the type value (block type field) of the control block. When the control value is "0x1E" (hexadecimal), it indicates that the control block is an idle code block (IDLE block). The content in the rear of the code block is idle information. For example, a C block includes $C_0$, $C_1$, $C_2$, $C_3$, $C_4$, $C_5$, $C_6$, and $C_7$. When the control value is "0x78" (hexadecimal), it indicates that the control block is an S block (or an S0 block, indicating the starting block of the packet). An S block indicates the starting block of one packet. After being encoded, the preamble part (including the frame delimiter) of the client packet becomes an S block. For example, the S block includes $D_1$, $D_2$, $D_3$, $D_4$, $D_5$, $D_6$, and $D_7$. The packet content part is behind the S block; accordingly, a D block is behind the S block. When the control value is 0x87, 0x99, 0xAA, 0xFF, 0xB4, 0xCC, 0xD2, 0xE1, and 0xFF, it indicates that the control block is T0, T1, T2, T3, T4, T5, T6, and T7 respectively. 8 types of T blocks exist in total. A T block indicates the terminating block of one data packet. Since the length of the packet is uncertain, after the main part of one packet is encoded into at least one D block, the remaining bytes, if less than 8 bytes, cannot be encoded into a D block. The remaining bytes may be 0, 1, 2, 3, 4, 5, 6, or 7 bytes. Accordingly, as for the format, 8 types of T blocks are defined. Different T blocks carry different numbers of data bytes (that is, 0, 1, 2, 3, 4, 5, 6, and 7 bytes) of the remaining part in the packet.

The defined virtual intermediate client packet is converted into a 66-bit block to be carried in the FlexE slot. In the application, the format of a cell composed of 66-bit code blocks can be directly used for carrying the small-particle client packet instead of the Ethernet packet format, greatly improving bandwidth utilization rate. As for the format, a cell of the virtual intermediate client is composed of a cell border indication code block and a data code block.

Figure 2D:
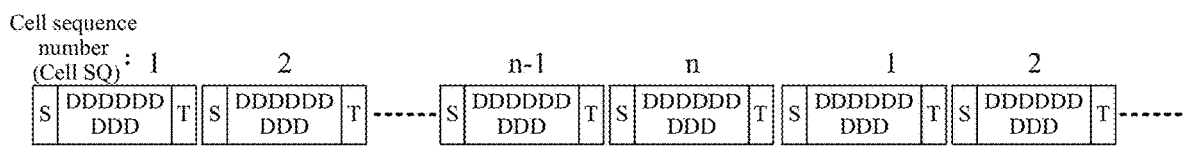
FIG. 2D is a diagram illustrating the transmission of small-particle services is implemented using cells composed of 66-bit blocks according to the present application.

FIG. 2D is a diagram illustrating the transmission of small-particle services is implemented using cells composed of 66-bit blocks according to the present application. Referring to FIG. 2D, a cell is composed of an S block+a fixed number of D blocks+a T block (m is a positive integer). One fixed-length cell is constituted using an S block+a fixed number of D blocks+a T block. A fixed-length cell packet composed of 66-bit code blocks is used for carrying a low-rate small-particle client. In this case, the bandwidth utilization rate for carrying client information is improved significantly. For example, when T7 is used as the terminating block of the cell, the T7 block can carry 7 bytes of real client information. When the cell packet structure is an S block+32 D blocks+T7, the client information is carried on the D blocks and the T block. One cell can carry 263 real client bytes considering that 32*8+7=263. The length of the cell is 272 bytes considering that 8+32*8+8=272. The bandwidth utilization rate for the cell carrying the client is that 263/272=96.32%. Compared with the solution of using a standard Ethernet packet, the solution of using a cell composed of 66-bit code blocks has greatly improved bandwidth utilization rate. If the number of D blocks in the cell increases, the bandwidth utilization rate of the cell carrying the client information will be greater.

Figure 2E:
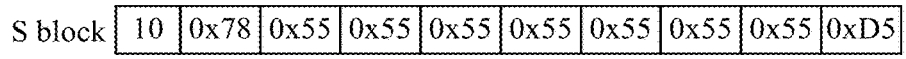
FIG. 2E is a diagram illustrating the structure of an S block after an Ethernet packet is 64/66 encoded according to the present application.

FIG. 2E is a diagram illustrating the structure of an S block after an Ethernet packet is 64/66 encoded according to the present application. In Ethernet standards, after the Ethernet packet is 64/66 encoded, the preamble and the frame delimiter are encoded into an S block. The structure of the encoded S block is shown in FIG. 2E. The content of each of the 7 bytes in the rear of the S block is a fixed value, where the content of each of 6 bytes is "0x55" (preamble byte content) and the content of 1 byte is "0xD5" (frame delimiter byte content). The content of each of these 7 bytes is a fixed value. In the present application, the positions of part of these bytes can be reused for transmitting the overhead information (for example, sequence number, cell type indication, and OAM information) of the cell. For example, the overhead information is carried in the content of the 7 bytes in the rear of the S block. The cell type indication may include a null cell indication signal (Null) and a cell forward alarm indication signal (AIS). For example, in the S block, the positions of 3 bytes (24 bits) are used for transmitting the overhead information of the cell, where the overhead information is a null cell indication signal (Null), a cell forward alarm indication signal (AIS), a cell sequence (Cell SQ) number value, and cell operations, administration and maintenance (OAM) information. In an implementation, the overhead information of a cell may include but is not limited to these four types of content.

Figure 2F:
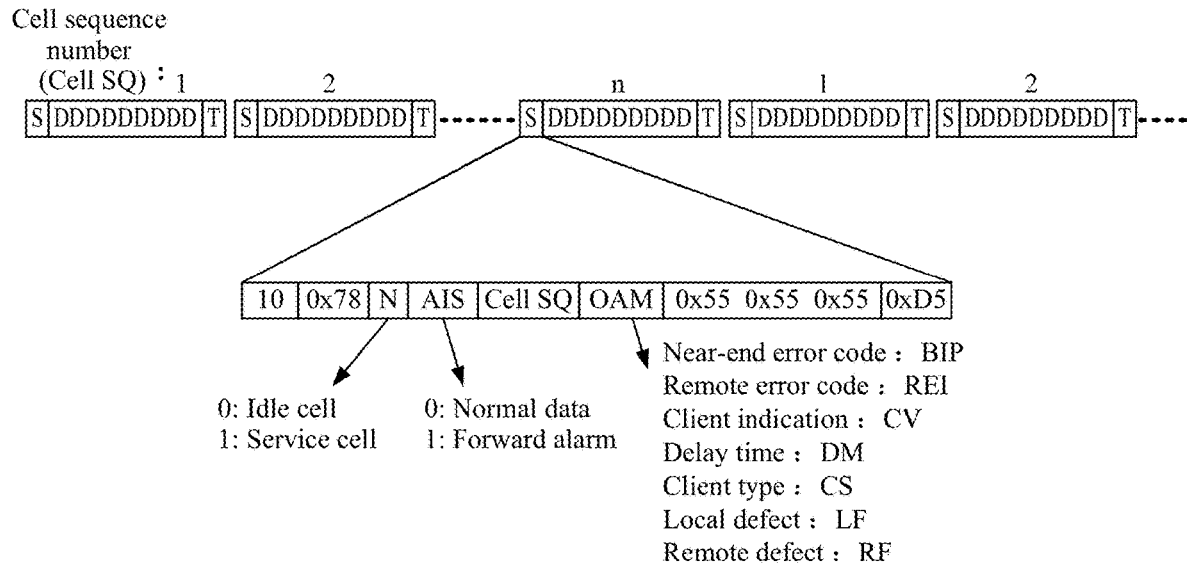
FIG. 2F is a diagram illustrating the structure in which the S block in a cell carries overhead information according to the present application.

FIG. 2F is a diagram illustrating the structure in which the S block in a cell carries overhead information according to the present application. Referring to FIG. 2F, the overhead information of the cell is placed at the position of the second byte, the position of the third byte, and the position of the fourth byte. In an actual application, the overhead information may also be placed at the positions of other bytes in the S block, which is not limited here.

Figure 2G:
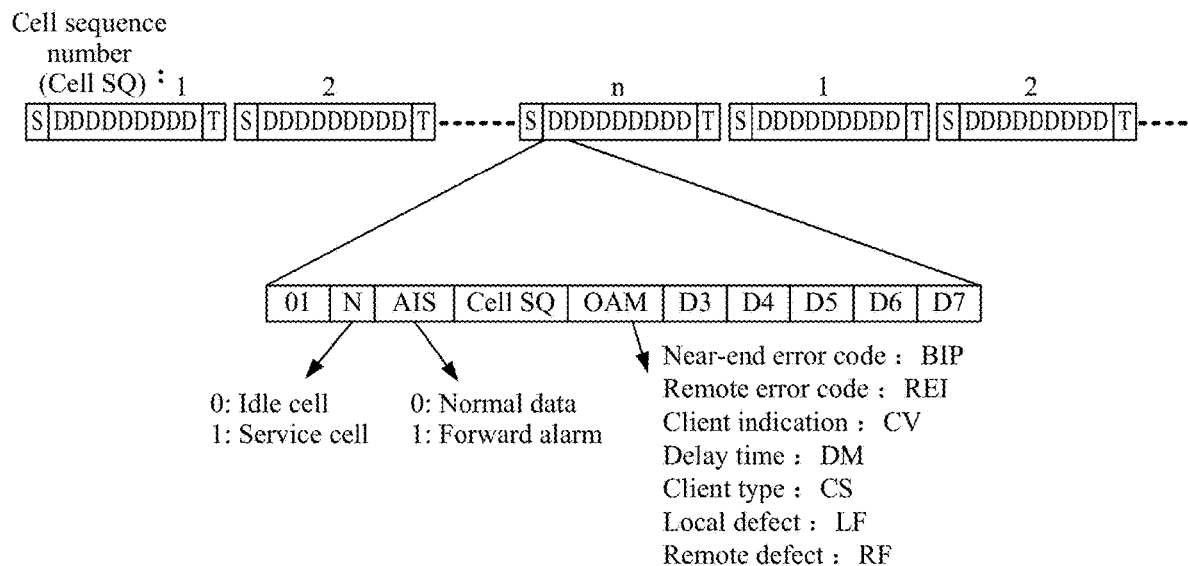
FIG. 2G is a diagram illustrating the structure of the overhead information on a D block in a cell according to the present application.

The overhead information may be placed in a D block. For example, the overhead information may be placed at the position of the D block behind the S block and part of the D block carries the overhead information. FIG. 2G is a diagram illustrating the structure of the overhead information on a D block in a cell according to the present application. Referring to FIG. 2G, the overhead information is placed at the position of the first D code block. Among the 8 bytes in the first D code block, part of the bytes transmit the overhead information and part of the bytes transmit the client information. For example, in the first D code block, the first 3 bytes are used for carrying the overhead information, and the last 5 bytes are used for transmitting the real client information. Alternatively, in the first D code block, the first 6 bytes are used for carrying a real client information, and the last 2 bytes are used for transmitting the overhead information.

Figure 2H:
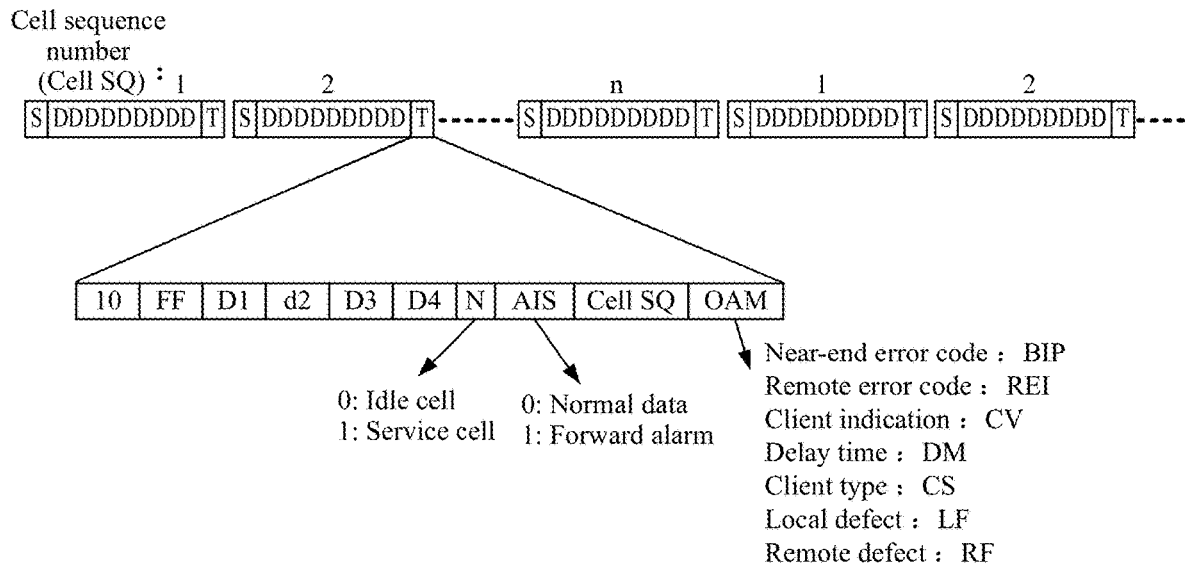
FIG. 2H is a diagram illustrating the structure of the overhead information on the T block in a cell according to the present application.

The overhead information may also be placed on a T block. FIG. 2H is a diagram illustrating the structure of the overhead information on the T block in a cell according to the present application. Referring to FIG. 2H, T7 serves as the terminating block of the cell. Another T code block may also serve as the terminating block of the cell. In T7, part of the bytes are used for transmitting the overhead information, and part of the bytes are used for transmitting the client information. For example, the overhead information is placed on the sixth byte, seventh byte and eighth byte in the T block; and in the T7 block, the second byte, the third byte, the fourth byte, and the fifth byte are used for transmitting the client information. In an actual application, the overhead information may also be placed at the positions of other bytes in the T block. When another control code block is used as a border indication of the cell, the overhead information may be placed on the cell border indication code block.

Figure 2I:
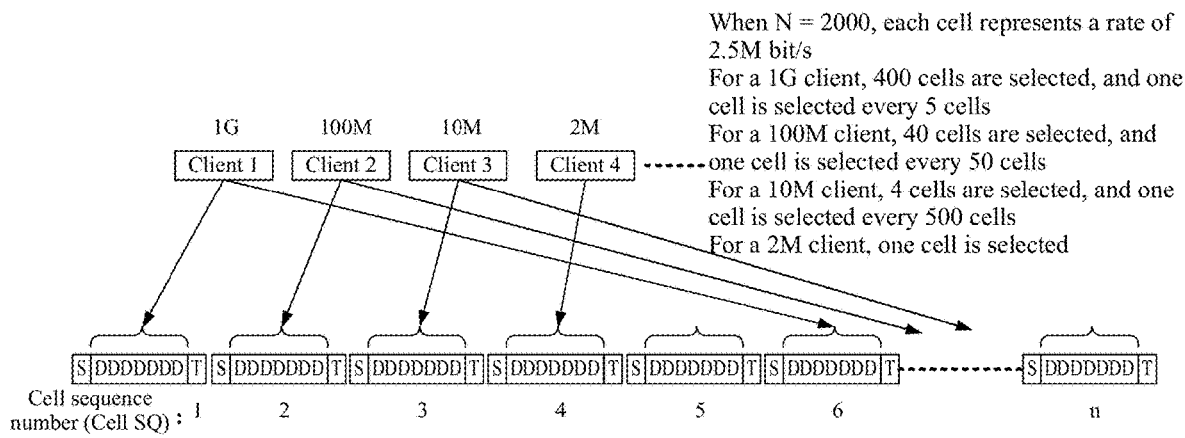
FIG. 2I is a diagram illustrating the process in which client packets with different rates are carried through cells according to the present application.

Real client services may be mapped to the cells of the virtual client. The real client content may be 64/66 encoded, and the encoded information content is carried on the cells for transmission. FIG. 2I is a diagram illustrating the process in which client packets with different rates are carried through cells according to the present application. The client packets are client data. Referring to FIG. 2I, the sequence number range of the cells may be 1 to 2000; that is, the value of n is 2000. A sequence number appears cyclically every 2000 cells. When all the cells are transmitted through one FlexE slot, the total bandwidth of the cells is 5G bit/s. For a cell with a fixed sequence number value, the physical bandwidth of such cell is 2.5M bit/s. This example may include client 1, client 2, client 3, client 4, and the like. For a 1G-rate client service, 400 cells out of the 2000 cells are selected for carrying and transmitting the client service, and the bandwidth of the 400 cells is 1G bit/s. In order to reduce the delay time of a client packet, in a specific implementation, carrying cells are selected at equal intervals. For a 1G-rate client service, one cell is selected every 5 cells to transmit the 1G-rate client information; for example, cells whose sequence numbers are 1, 6, 11, 16, and the like are selected to carry a client packet. For a 100M-rate client service, one cell is selected every 50 cells to transmit the 100M-rate client information. For a 10M-rate client service, one cell is selected every 500 cells to transmit the 10M-rate client information. For a client packet with another rate, a similar manner is used. For a 2M-rate E1 client service, one cell is selected to carry the E1 client service.

Figure 2J:
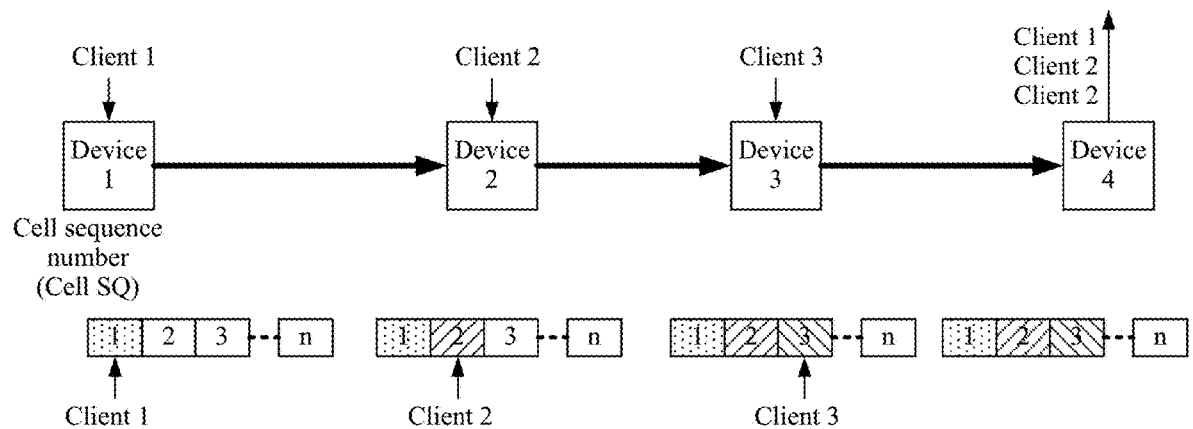
FIG. 2J is a diagram illustrating the process in which cells are transmitted in a device network using the FlexE technology according to the present application.

FIG. 2J is a diagram illustrating the process in which cells are transmitted in a device network using the FlexE technology according to the present application. Referring to FIG. 2J, fixed-length cell packets (for example, cell packets with a length of n) are used for carrying the client data of small-particle and low-rate clients. Each cell packet is identified through a cell sequence number. In the figure, four devices form a transmission network by using the FlexE technology. On the FlexE channel between device 1 and device 4, one slot (5G bits/s) is selected to serve as the transmission channel of the small-particle and low-rate clients. One virtual intermediate client is created on the transmission channel. The virtual intermediate client includes the fixed-length cells. Each cell carries a sequence number (a cell SQ value as shown in the figure) and other overhead fields. A cell packet is of a fixed length. A sequence number appears circularly. The cell packets can be transmitted from device 1 to device 4 at the full traffic (a rate of 5G bit/s). On intermediate device 2 and intermediate device 3, the cells are received from one direction of each of the devices and then crossed to the other direction to be sent out. On device 2 and device 3, new clients come in and out. On device 1, part of the cells are selected to carry the content (that is, the client data) of client 1. For example, cells corresponding to cell sequence numbers of 1, 6, 11, 16, and the like are selected to carry the client data of client 1; and the carrying bandwidth is 1G bit/s. When the cells pass through device 2, part of the cells are selected to carry the content of client 2. For example, cells whose cell sequence numbers are 2, 7, 12, 17, and the like are selected to carry the client data of client 2; and the carrying bandwidth is 1G bit/s. Similarly, when the cells pass through device 3, part of the cells are selected to carry the content of client 3. For example, cells whose cell sequence numbers are 3, 8, 13, 18, and the like are selected to carry the client data of client 3. On device 4, the information, for example, the client data, of client 1 is extracted and recovered from cells whose cell sequence numbers are 1, 6, 11, 16, and the like; the information of client 2 is extracted and recovered from cells whose cell sequence numbers are 2, 7, 12, 17, and the like; and the information of client 3 is extracted and recovered from cells whose cell sequence numbers are 3, 8, 13, 18, and the like. One FlexE slot is divided into multiple cell sub-slots through these cells. Each cell sub-slot constitutes a low-rate transmission channel. Transmission channels with different rates are formed by combining different numbers of cell sub-slots. In this example, different cell sub-channels are selected to carry different small-particle and low-rate clients. These small-particle clients are isolated from each other completely, are independent of each other, and do not affect each other.

Figure 2K:
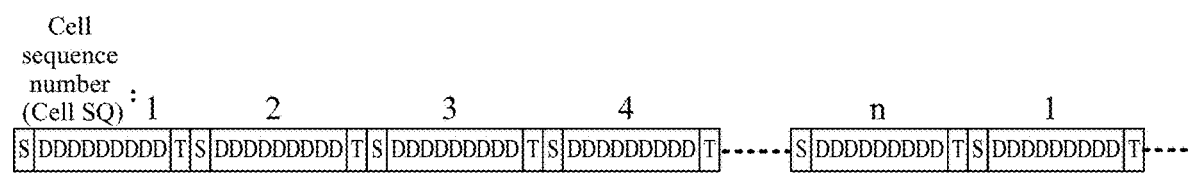
FIG. 2K is a diagram illustrating how cells are transmitted in a FlexE slot according to the present application.

FIG. 2K is a diagram illustrating how cells are transmitted in a FlexE slot according to the present application. Referring to FIG. 2K, in the present application, as for the format, a cell may be composed of an S block+D blocks+a T block. When being transmitted in the FlexE protocol slot, no space is left between all the cells. Two adjacent cells are connected together. When the cells are connected together with no idle position left between, the cells fill the selected FlexE slot. The cell bandwidth is the same as the slot bandwidth, resulting in the highest utilization rate of the FlexE slot bandwidth. In the transmission network composed by using the FlexE technology, a deviation exists between clock frequencies of different devices in the network. As shown in FIG. 2J, a deviation exists between the clock frequency of device 1 and the clock frequency device 2. Accordingly, the receiving rate of a FlexE client service of device 2 is different from the sending rate of the FlexE client service of device 2. It is necessary to add and delete an idle information block (IDLE block) for the client service so as to adjust the rate of the client service and adapt to the frequency deviation between the receiving direction and the sending direction. When all the cells are adjacent to each other, no idle information block exists in the cell stream so that no idle information block is deleted, making the rate unable to be adjusted.

Figure 2L:
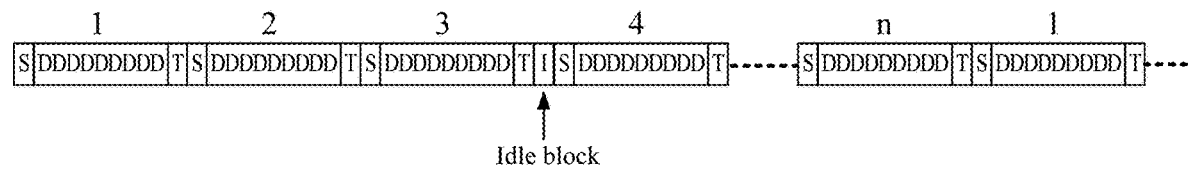
FIG. 2L is a diagram illustrating that an idle information block is inserted between cells in a FlexE protocol slot according to the present application.

FIG. 2L is a diagram illustrating that an idle information block is inserted between cells in a FlexE protocol slot according to the present application. As shown in FIG. 2L, in order to provide the capability of adjusting the rate of a cell stream, an idle information block, that is, an I block, can be inserted into the cell stream. Ethernet standards stipulate that the maximum deviation between the device clock frequency and the nominal clock frequency is positive and negative 100 PPM (PPM: percent per million). The maximum clock deviation between any two devices is 200 PPM. 200 idle blocks are inserted every million code blocks in the code stream so that the function of clock frequency deviation adjustment is satisfied. An inserted idle information block needs to be located between two cell code blocks. That is, one idle information block is inserted every 5000 information code blocks. The cell code block stream with an appropriate number of idle information blocks inserted is carried by the FlexE slot and sent out. In the carrying network, each intermediate device adds or deletes one or more idle information blocks in the cell code block stream according to the clock frequency deviation so as to implement rate adjustment and adaptation. Finally, the cell code block stream is sent to the last receiving device.

Figure 2M:
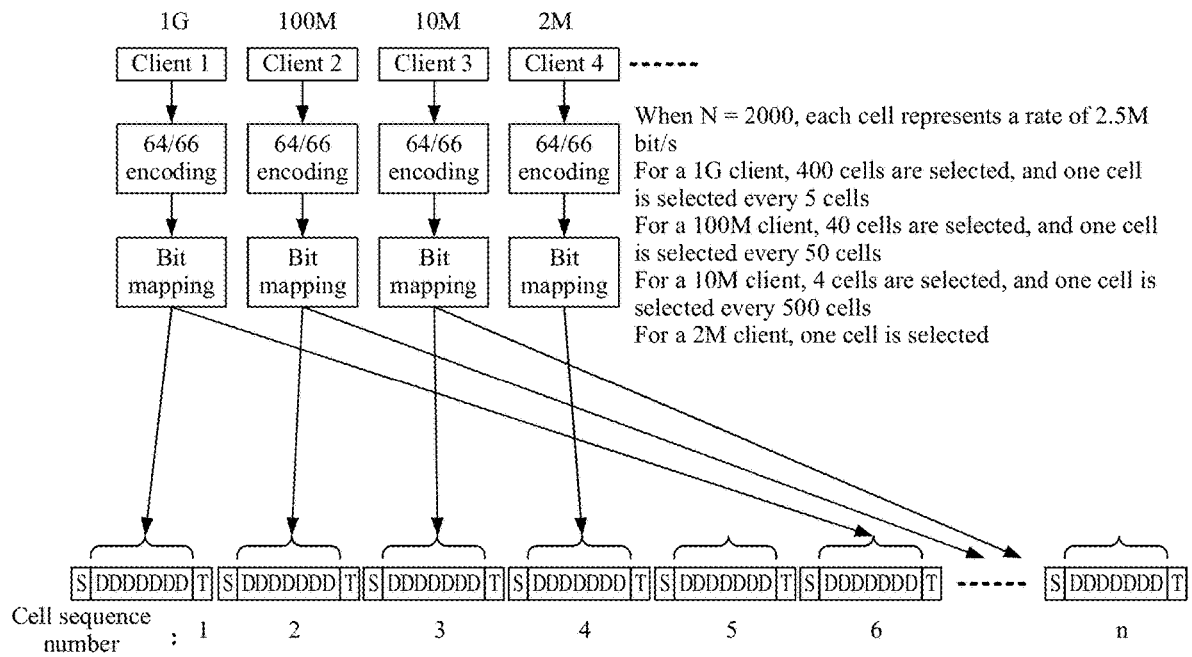
FIG. 2M is a diagram illustrating the process in which client data after being 64/66 encoded is carried by cells according to the present application.

FIG. 2M is a diagram illustrating the process in which client data after being 64/66 encoded is carried by cells according to the present application. As shown in FIG. 2M, a FlexE protocol slot is divided into multiple sub-slots in the manner of cell packets so as to achieve smaller transmission channels. When the cell packets carry client packets and when a client is a service with a continuous and constant bit rate (CBR), for example, an E1 service, a synchronous digital hierarchy (SDH) service, or an optical transport network (OTN) service, a client service byte or the bit content is directly placed in the cell packet carrying part. When the client packets are the content including Ethernet packets, because a packet has starting information and ending information, each client packet is encoded first, for example, 64/66 encoded. After a client packet is encoded, a 66-bit code block stream is obtained. All bit values in all code blocks in code block streams of continuous 66-bit lines are connected in series to form a continuous single-bit stream. These bit stream values are recut into 64-bit lengths and carried on D bytes in the cells for transmission so as to implement bit mapping.

Because a cell carries overhead bytes, the part carrying client information on the cell accounts for only a part of the entire cell. The bandwidth utilization rate of the carrying channel cannot reach 100%. Moreover, after a client packet is 64/66 encoded, the 64-bit content is increased into the 66-bit content, causing a bandwidth expansion and further reducing bandwidth utilization rate.

Figure 2N:
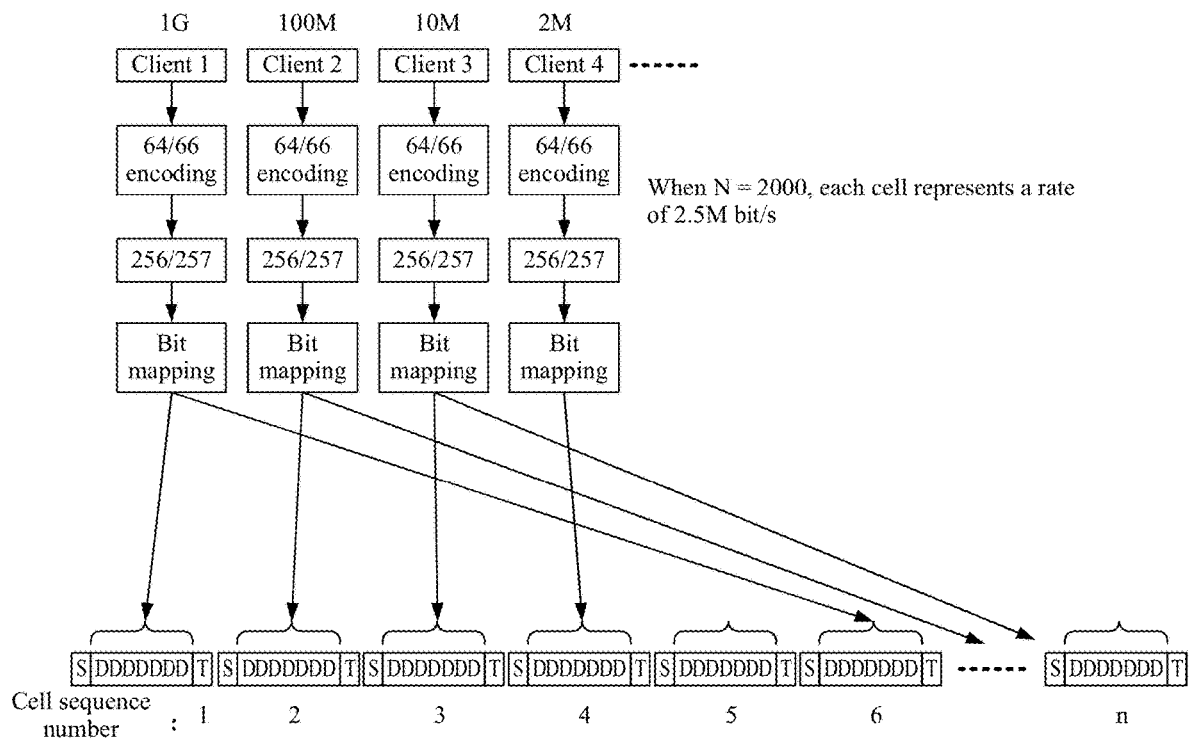
FIG. 2N is a diagram illustrating the process in which client data after being 64/66 encoded and 256/257 encoded is carried by cells according to the present application.

FIG. 2N is a diagram illustrating the process in which client data after being 64/66 encoded and 256/257 encoded is carried by cells according to the present application. Referring FIG. 2N, in order to improve bandwidth utilization rate, after being 64/66 encoded, a client packet can be further 256/257 encoded. In this case, four 66-bit code blocks are encoded into one 257-bit code block, reducing the bandwidth expansion caused by encoding and improving bandwidth utilization rate. How to encode a client service, that is, client data, and how to map the client service to a cell may be implemented in various specific manners and are all within the protection scope of the present application.

In the preceding example, one virtual intermediate client is established on one 5G slot of the FlexE protocol. The virtual intermediate client uses fixed-length cells or fixed-length packets. Part of the cells or packets are selected to carry real small-particle low-rate client content. In a specific implementation, one virtual intermediate client may be established on multiple 5G slots of the FlexE protocol. For example, two 5G slots of the FlexE protocol are arbitrarily selected for establishing a virtual intermediate client. In this case, the bandwidth of the virtual intermediate client is 10G bit/s. When the cell sequence number range is from 1 to 2000, the cell of each sequence number represents a bandwidth of 5M bit/s. In one cycle period of sequence numbers, 200 cells are selected to carry a small-particle low-rate client (one cell is selected every ten cells). Then the bandwidth carrying the small-particle low-rate service is 1G so that a 1G-rate transmission channel is provided. In a specific implementation, one virtual intermediate client may be established on any number of FlexE slots. The cell sequence number range may be a range covering any count of sequence numbers. These are all within the scope of the present application.

Figure 2O:
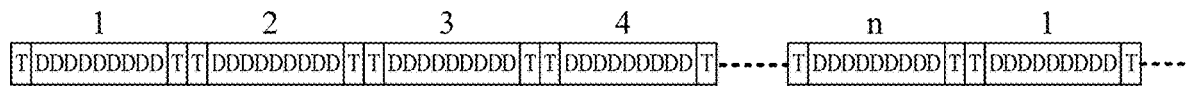
FIG. 2O is a diagram illustrating that a cell is composed of T blocks and D blocks according to the present application.

In the present application, a cell structure may be composed of an S block+D blocks+a T block. This is a special example of a cell structure. A uniform structure feature of cells is a border code block+a data code block. A border code block is used for indicating the starting position and ending position of a cell. Two types of code blocks may be arranged as border code blocks, with one code block indicating the starting position and the other one code block indicating the ending position. Alternatively, only one type of code block may be arranged as a border code block to simultaneously indicate the ending position of a cell in front and the starting position of a cell behind. A data code block is used for carrying client information content. The specific format of a cell may be of various types. For example, an S block and a T block do not serve as the starting block and terminating block of a cell respectively, but another type of control-type code block serves as the starting block or terminating block of a cell. FIG. 2O is a diagram illustrating that a cell is composed of T blocks and D blocks according to the present application. Referring to FIG. 2O, in the present application, two consecutive T blocks may serve as the starting block of a cell and the terminating block of another cell respectively. The T block in front is the terminating block of a cell. The T block behind is the starting block of another cell.

Figure 2P:
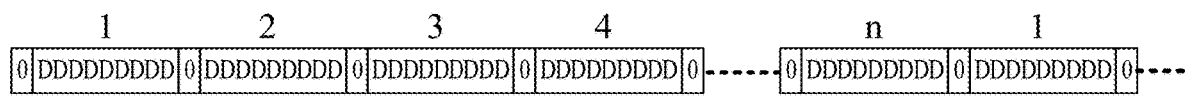
FIG. 2P is a diagram illustrating that a cell is composed of an O block and D blocks according to the present application.

FIG. 2P is a diagram illustrating that a cell is composed of an O block and D blocks according to the present application. Referring to FIG. 2P, a cell structure may not need a starting block and a terminating block but needs only one cell border code block. A cell border code block is both the ending position of a cell in front and the starting position of a cell behind. All data code blocks between two cell border code blocks are the carrying part of a cell. A user-defined control code block is used as a cell border code block and may be an O block in the Ethernet-defined encoding. The O block carries user-defined identification content, for example, the encoding result of the fourth line in 64/66 encoding rules (the control content in the O block is "0x4B"; various values may be used as the O0 value in the code block; and a user-defined special value is taken in the present application to get distinguished from the existing O0 value in the standards).

Figure 3:
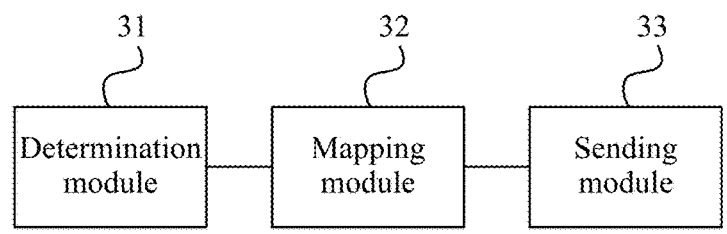
FIG. 3 is a diagram illustrating the structure of a data transmission apparatus according to the present application.

The present application provides a data transmission apparatus. The apparatus may be integrated into a terminal device. FIG. 3 is a diagram illustrating the structure of a data transmission apparatus according to the present application. As shown in FIG. 3, the data transmission apparatus provided in the present application includes a determination module 31, a mapping module 32, and a sending module 33. The determination module 31 is configured to determine a basic unit carrying client data. The rate of the client data is smaller than the set value. The basic unit is a basic unit included in a basic unit set. The mapping module 32 is configured to map the client data to the basic unit. The sending module 33 is configured to send, through the flexible Ethernet (FlexE) slot, the basic unit set to which the client data is mapped.

The data transmission apparatus provided in this embodiment is configured to implement the data transmission method of the embodiments shown in FIG. 1. The data transmission apparatus provided in this embodiment has similar implementation principles and technical effects to the data transmission method of the embodiments shown in FIG. 1, which are not repeated here.

On the basis of the preceding embodiments, variant embodiments of the preceding embodiment are proposed. It is to be noted here that for ease of description, only differences from the preceding embodiment are described in the variant embodiments.

In one embodiment, the basic unit includes a packet or a cell.

In one embodiment, the basic unit set includes at least one basic unit and is used for carrying the client data of at least one terminal device.

In one embodiment, overhead information is included on the basic unit. The overhead information includes one or more of the following: sequence information used for identifying the basic unit, idle indication information, or operations, administration and maintenance information.

In one embodiment, in the case where the basic unit is a cell, the cell is formed by combining different target code blocks. The target code blocks include a border control code block and a data code block. The data code block is used for carrying the client data. The border control code block is used for identifying a border of the cell. The border control code block includes one or more of the following: an S block, a T block, an O block, or a predefined control code block.

In one embodiment, the overhead information in the basic unit is carried on the target code blocks.

In one embodiment, the mapping module 32 is specifically configured to, in the case where the basic unit is a packet, map the client data to the content carrying part of the packet and, in the case where the basic unit is a cell, map the client data to a data code block of the cell.

In one embodiment, at least one FlexE slot is provided.

In one embodiment, in the case where the basic unit set is sent through the FlexE slot, an idle information block is inserted every set number of basic units.

Figure 4:
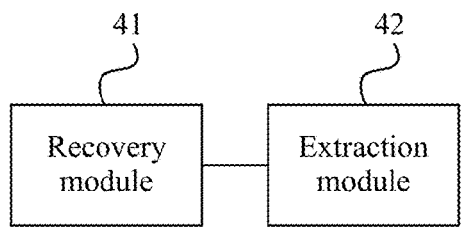
FIG. 4 is a diagram illustrating the structure of another data transmission apparatus according to the present application.

The present application further provides a data transmission apparatus. The apparatus may be integrated into a terminal device. FIG. 4 is a diagram illustrating the structure of another data transmission apparatus according to the present application. As shown in FIG. 4, the apparatus includes a recovery module 41 and an extraction module 42. The recovery module 41 is configured to recover a basic unit set from a FlexE slot. The extraction module 42 is configured to extract client data from the basic unit set.

The data transmission apparatus provided in this embodiment is configured to implement the data transmission method of the embodiments shown in FIG. 2. The data transmission apparatus provided in this embodiment has similar implementation principles and technical effects to the data transmission method of the embodiments shown in FIG. 2, which are not repeated here.

On the basis of the preceding embodiments, variant embodiments of the preceding embodiment are proposed. It is to be noted here that for ease of description, only differences from the preceding embodiment are described in the variant embodiments.

In one embodiment, the extraction module 42 is specifically configured to determine the basic unit that carries the client data and is in the basic unit set and extract the client data carried in the basic unit.

In one embodiment, as for the extraction module 42, the configuration in which the basic unit that carries the client data and is in the basic unit set is determined includes the following.

The sequence information of the basic unit carrying the client data is determined.

The basic unit that carries the client data and is in the basic unit set is determined based on the sequence information.

In one embodiment, the basic unit set includes at least one basic unit and is used for carrying the client data of at least one terminal device.

In one embodiment, the basic unit includes a packet or a cell.

In one embodiment, overhead information is included on the basic unit. The overhead information includes one or more of the following: sequence information used for identifying the basic unit, idle indication information, or operations, administration and maintenance information.

In one embodiment, in the case where the basic unit is a cell, the cell is formed by combining different target code blocks. The target code blocks include a border control code block and a data code block. The data code block is used for carrying the client data. The border control code block is used for identifying a border of the cell. The border control code block includes one or more of the following: an S block, a T block, an O block, or a predefined control code block.

In one embodiment, the overhead information in the basic unit is carried on the target code blocks.

In one embodiment, at least one FlexE slot is provided.

Figure 5:
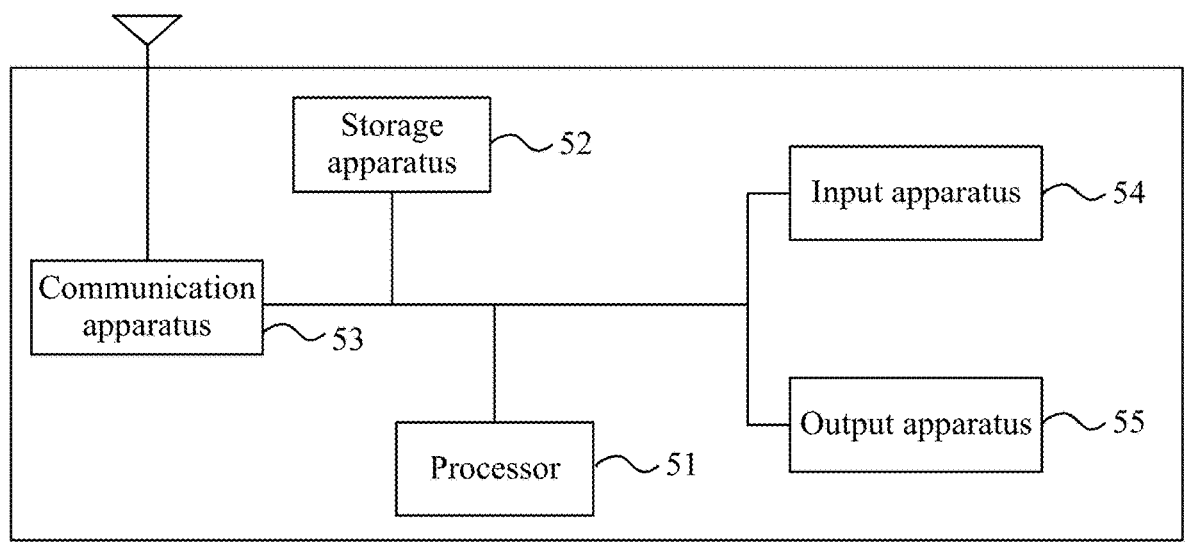
FIG. 5 is a diagram illustrating the structure of a terminal device according to the present application.

The present application provides a terminal device. FIG. 5 is a diagram illustrating the structure of a terminal device according to the present application. As shown in FIG. 5, the terminal device provided in the present application includes one or more processors 51 and a storage apparatus 52. One or more processors 51 may be provided in the terminal device. In FIG. 5, one processor 51 is taken as an example. The storage apparatus 52 is configured to store one or more programs. When executed by the one or more processors 51, the one or more programs cause the one or more processors 51 to implement the data transmission method described in embodiments of the present application.

The terminal device further includes a communication apparatus 53, an input apparatus 54, and an output apparatus 55.

The one or more processors 51, the storage apparatus 52, the communication apparatus 53, the input apparatus 54, and the output apparatus 55 that are in the terminal device may be connected through a bus or in other manners. In FIG. 5, the connection through the bus is taken as an example.

The input apparatus 54 may be used for receiving inputted digital or character information and for generating key signal input related to user settings and function control of the terminal device. The output apparatus 55 may include a display device, for example, a display screen.

The communication apparatus 53 may include a receiver and a transmitter. The communication apparatus 53 is configured to perform information transceiving and communication under the control of the one or more processors 51.

As a computer-readable storage medium, the storage apparatus 52 may be configured to store software programs, computer-executable programs and modules, such as program instructions/modules (for example, the determination module 31, the mapping module 32, and the sending module 33 that are in the data transmission apparatus; in another example, the recovery module 41 and the extraction module 42 that are in the data transmission apparatus) corresponding to the data transmission method according to embodiments of the present application. The storage apparatus 52 may include a program storage area and a data storage area. The program storage area may store an operating system and an application program required by at least one function. The data storage area may store data created depending on use of a terminal device. Additionally, the storage apparatus 52 may include a high-rate random-access memory and may further include a nonvolatile memory, such as at least one disk memory, a flash memory, or another nonvolatile solid-state memory. In some examples, the storage apparatus 52 may further include memories located remotely relative to the one or more processors 51, and these remote memories may be connected to the terminal device via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform any data transmission method according to embodiments of the present application. The data transmission method includes determining a basic unit carrying client data, where the rate of the client data is smaller than the set value, the set value is determined according to the bandwidth of a flexible Ethernet (FlexE) slot, and the basic unit is a basic unit included in a basic unit set; mapping the client data to the basic unit; and sending, through the FlexE slot, the basic unit set to which the client data is mapped.

Alternatively, the data transmission method includes recovering a basic unit set from a FlexE slot and extracting client data from the basic unit set. The basic unit set includes a basic unit carrying the client data. The rate of the client data is smaller than the set value. The set value is determined according to the bandwidth of the FlexE slot.

The computer storage medium in embodiments of the present application may use any combination of one or more computer-readable media. A computer-readable medium may be a computer-readable signal medium or a computer-readable storage medium. The computer-readable storage medium may be, but is not limited to, an electrical, magnetic, optical, electromagnetic, infrared, or semiconductor system, apparatus, or element, or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable Compact Disc ROM (CD-ROM), an optical storage element, a magnetic storage device, or any suitable combination thereof. The computer-readable storage medium may be any tangible medium including or storing a program. The program may be used by or used in conjunction with an instruction execution system, apparatus, or element.

The computer-readable signal medium may include a data signal propagating in baseband or as part of a carrier wave. The computer-readable signal medium carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than a computer-readable storage medium. The computer-readable medium may send, propagate, or transmit the program used by or used in conjunction with the instruction execution system, apparatus, or element.

The program codes contained in the computer-readable medium may be transmitted by using any appropriate medium. The appropriate medium includes, but is not limited to, wireless, a wire, an optical fiber, radio frequency (RF) and the like, or any appropriate combination thereof.

Computer program code for performing the operations of the present application may be written in one or more programming languages or a combination thereof, including object-oriented programming languages such as Java, Smalltalk, C++, as well as conventional procedural programming languages such as "C" or similar programming languages. The program codes may be executed entirely on a user computer, partly on the user computer, as a standalone software package, partly on the user computer and partly on a remote computer, or entirely on the remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The preceding are only examplary embodiments of the present application and are not intended to limit the scope of the present application.

It is to be understood by those skilled in the art that the term terminal device encompasses any appropriate type of radio user device, such as a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

Embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD), or a compact disc (CD)). The one or more computer-readable media may include a non-transitory storage medium. The data processor may be of any type suitable to the local technical environment, such as, but is not limited to, a general purpose computer, a special purpose computer, a microprocessor, a digital signal processor (DSP), an application specific integrated circuit (ASIC), a field-programmable gate array (FGPA), and a processor based on a multi-core processor architecture.

A detailed description of exemplary embodiments of the present application has been provided in the preceding through exemplary and non-restrictive examples. However, considering the drawings and the claims, various modifications and adjustments to the preceding embodiments are obvious to those skilled in the art but do not deviate from the scope of the present application. Accordingly, the proper scope of the present application is determined according to the claims.

What is claimed is:

1. A data transmission method, applied to a sending end, comprising:
    determining a basic unit carrying a client service, wherein a rate of the client service is smaller than a set value, the set value is determined according to a bandwidth of a flexible Ethernet (FlexE) slot, and the basic unit is a basic unit comprised in a basic unit set;
    mapping the client service to the basic unit; and
    sending, through the FlexE slot, the basic unit set to which the client service is mapped;
    wherein each basic unit in the basic unit set serves as a transmission channel, the FlexE slot is divided into a plurality of sub-channels, and a number of the plurality of sub-channels is determined according to a number of basic units comprised in the basic unit set;
    the plurality of sub-channels share one FlexE slot, each sub-channel carries one client service, and clients are physically isolated from each other.

2. A non-transitory storage medium storing a computer program which, when executed by a processor, causes the processor to implement the method according to claim 1.

3. A data transmission apparatus, comprising a memory and a processor, wherein the memory stores a computer program, and the computer program comprises:
    a determination module configured to determine a basic unit carrying a client service, wherein a rate of the client service is smaller than a set value, the set value is determined according to a bandwidth of a flexible Ethernet (FlexE) slot, and the basic unit is a basic unit comprised in a basic unit set;
    a mapping module configured to map the client service to the basic unit; and
    a sending module configured to send, through the flexible Ethernet (FlexE) slot, the basic unit set to which the client service is mapped;
    wherein each basic unit in the basic unit set serves as a transmission channel, the FlexE slot is divided into a plurality of sub-channels, and a number of the plurality of sub-channels is determined according to a number of basic units comprised in the basic unit set;

the plurality of sub-channels share one FlexE slot, each sub-channel carries one client service, and clients are physically isolated from each other.

4. The apparatus according to claim 3, wherein the basic unit comprises a packet or a cell.

5. The apparatus according to claim 3, wherein the basic unit set comprises at least one basic unit, and the basic unit set is used for carrying client services of at least one terminal device.

6. The apparatus according to claim 3, wherein the basic unit comprises overhead information, and the overhead information comprises at least one of the following: sequence information used for identifying the basic unit, idle indication information, or operations, administration and maintenance (OAM) information.

7. The apparatus according to claim 3, wherein the basic unit is a cell, the cell is formed by combining different target code blocks; the different target code blocks comprise a border control code block and a data code block; the data code block is used for carrying the client service; the border control code block is used for identifying a border of the cell; and the border control code block comprises at least one of the following: a starting block (S block), a terminating block (T block), an OAM block (O block), or a predefined control code block.

8. The apparatus according to claim 7, wherein overhead information in the basic unit is carried by the target code blocks.

9. The apparatus according to claim 3, wherein the basic unit is one of:
a packet, wherein client service is mapped to a content carrying part of the packet; or
a cell, wherein the client service is mapped to a data code block of the cell.

10. The apparatus according to claim 3, wherein at least one FlexE slot is provided.

11. The apparatus according to claim 3, wherein the sending module is further configured to:
inserting an idle information block every set number of basic units.

12. A data transmission apparatus, comprising a memory and a processor, wherein the memory stores a computer program, and the computer program comprises:
a receiving module configured to receive a basic unit set to which a client service is mapped from a flexible Ethernet (FlexE) slot;
a determination module configured to determine a basic unit carrying the client service in the basic unit set, wherein a rate of the client service is smaller than a set value, the set value is determined according to a bandwidth of the FlexE slot, and the basic unit is a basic unit comprised in the basic unit set; and
an demapping module configured to demap the basic unit carrying the client service to extract the client service carried in the basic unit;
wherein each basic unit in the basic unit set serves as a transmission channel, the FlexE slot is divided into a plurality of sub-channels, and a number of the plurality of sub-channels is determined according to a number of basic units comprised in the basic unit set;
the plurality of sub-channels share one FlexE slot, each sub-channel carries one client service, and clients are physically isolated from each other.

13. The apparatus according to claim 12, the determination module is further configured to:
determine sequence information of the basic unit carrying the client service; and
determine, based on the sequence information, the basic unit carrying the client service in the basic unit set.

14. The apparatus according to claim 12, wherein the basic unit set comprises at least one basic unit, and the basic unit set is used for carrying client services of at least one terminal device.

15. The apparatus according to claim 12, wherein the basic unit comprises a packet or a cell.

16. The apparatus according to claim 12, wherein the basic unit comprises overhead information, and the overhead information comprises at least one of the following: sequence information used for identifying the basic unit, idle indication information, or operations, administration and maintenance (OAM) information.

17. The apparatus according to claim 12, wherein the basic unit is a cell, the cell is formed by combining different target code blocks; the different target code blocks comprise a border control code block and a data code block; the data code block is used for carrying the client service; the border control code block is used for identifying a border of the cell; and the border control code block comprises at least one of the following: a starting block (S block), a terminating block (T block), an OAM block (O block), or a predefined control code block.

18. The apparatus according to claim 17, wherein overhead information in the basic unit is carried by the target code blocks.

19. The apparatus according to claim 12, wherein at least one FlexE slot is provided.

* * * * *